United States Patent
Kalmutzki et al.

(10) Patent No.: US 12,545,166 B2
(45) Date of Patent: Feb. 10, 2026

(54) FLUID VALVE MODULE, FLUID VALVE SYSTEM AND METHODS OF PRODUCING THE SAME

(71) Applicant: SCHUKRA BERNDORF GMBH, Berndorf (AT)

(72) Inventors: Martin Kalmutzki, Spalt (DE); Igor Berkovych, Nuremberg (DE); Sigurd Sturm, Nuremberg (DE); Daniel Schmitz, Altdorf (DE); Dominik Voelk, Neunkirchen a. Brand (DE); Gerhard Hoerber, Nuremberg (DE)

(73) Assignee: SCHUKRA BERNDORF GMBH, Berndorf (AT)

( * ) Notice: Subject to any disclaimer, the term of this patent is extended or adjusted under 35 U.S.C. 154(b) by 554 days.

(21) Appl. No.: 17/430,281

(22) PCT Filed: Jan. 17, 2020

(86) PCT No.: PCT/EP2020/051138
§ 371 (c)(1),
(2) Date: Aug. 11, 2021

(87) PCT Pub. No.: WO2020/169282
PCT Pub. Date: Aug. 27, 2020

(65) Prior Publication Data
US 2022/0080868 A1 Mar. 17, 2022

(30) Foreign Application Priority Data
Feb. 19, 2019 (EP) ..................................... 19157920

(51) Int. Cl.
*B60N 2/90* (2018.01)
*A61H 9/00* (2006.01)
(Continued)

(52) U.S. Cl.
CPC ........... *B60N 2/914* (2018.02); *A61H 9/0078* (2013.01); *F16K 11/24* (2013.01); *F16K 27/003* (2013.01)

(58) Field of Classification Search
CPC .............................. B60N 2/914; F16K 27/003
See application file for complete search history.

(56) References Cited

U.S. PATENT DOCUMENTS

| 3,203,447 | A | 8/1965 | Bremner et al. |
| 3,442,483 | A | 5/1969 | Schwartz |

(Continued)

FOREIGN PATENT DOCUMENTS

| CA | 2435356 A1 | 1/2001 |
| CN | 1277661 A | 12/2000 |

(Continued)

OTHER PUBLICATIONS

Chinese Patent Office Action for Related Application No. 202080011837.X dated Nov. 14, 2022 (18 pages, Including and English translation).

(Continued)

*Primary Examiner* — Reinaldo Sanchez-Medina
(74) *Attorney, Agent, or Firm* — Michael Best & Friedrich LLP (57) ABSTRACT

A fluid valve module (10), a fluid valve system (20) and methods (30A, 30B) of producing the same are provided. The fluid valve module (10) comprises a housing and a plurality of valve members (103). The housing comprises a housing body (101) and a housing cover (108). The housing body (101) comprises a fluid feed partition (104), a plurality of valve body partitions (105), and a plurality of valve ports (106). The housing body (101) further comprises wall openings (107) between an interior of the fluid feed partition (104) and an exterior of the housing body (101). The valve (Continued)

body partitions (105) are each shaped for mating with the housing cover (108) in a fluid-tight manner, and are each in fluid communication with the fluid feed partition (104) and at least one of the valve ports (106). The valve members (103) are each arranged in a respective valve body partition (105) for controlling a passage of a fluid from the fluid feed partition (104) via the respective valve body partition (105) to the at least one of the valve ports (106).

11 Claims, 4 Drawing Sheets

(51) Int. Cl.
*F16K 11/24* (2006.01)
*F16K 27/00* (2006.01)

(56) References Cited

U.S. PATENT DOCUMENTS

| | | | |
|---|---|---|---|
| 4,529,214 A | 7/1985 | Stoll et al. | |
| 4,548,041 A | 10/1985 | Taylor | |
| 4,630,799 A | 12/1986 | Nolan et al. | |
| 4,674,398 A | 6/1987 | Taylor | |
| 4,736,587 A | 4/1988 | Suzuki | |
| 4,903,732 A | 2/1990 | Allen | |
| 4,922,965 A | 5/1990 | Meister | |
| 4,973,024 A | 11/1990 | Homma | |
| 5,148,833 A | 9/1992 | Ota | |
| 5,211,371 A | 5/1993 | Coffee | |
| 5,904,172 A * | 5/1999 | Gifft | A47C 27/082 137/271 |
| 6,098,000 A | 8/2000 | Long et al. | |
| 6,203,105 B1 | 3/2001 | Rhodes, Jr. | |
| 6,499,509 B2 | 12/2002 | Berger et al. | |
| 7,744,059 B2 | 6/2010 | Jerg | |
| 7,815,161 B2 | 10/2010 | Saitoh et al. | |
| 8,499,779 B2 | 8/2013 | Gillespie | |
| 8,616,237 B2 | 12/2013 | Jansen et al. | |
| 8,629,745 B2 | 1/2014 | Sturman et al. | |
| 8,784,080 B2 | 7/2014 | Dorfler et al. | |
| 8,794,707 B2 | 8/2014 | Bocsanyi et al. | |
| 9,080,581 B2 * | 7/2015 | Bocsanyi | B60N 2/914 |
| 9,186,853 B2 | 11/2015 | Khan et al. | |
| 9,797,521 B1 | 10/2017 | Davis | |
| 9,945,490 B2 | 4/2018 | Dankbaar et al. | |
| 9,951,765 B2 | 4/2018 | Ki et al. | |
| 10,066,756 B2 | 9/2018 | Sohn | |
| 10,107,279 B2 | 10/2018 | Dankbaar et al. | |
| 10,107,410 B2 | 10/2018 | Dankbaar et al. | |
| 10,207,619 B2 | 2/2019 | Dankbaar et al. | |
| 10,290,876 B2 | 5/2019 | Prieto et al. | |
| 10,378,677 B2 | 8/2019 | Kuszneruk et al. | |
| 10,753,494 B2 | 8/2020 | Beuschel et al. | |
| 10,948,097 B2 | 3/2021 | Dorfler et al. | |
| 11,073,219 B2 | 7/2021 | Dorfler et al. | |
| 11,730,308 B2 | 8/2023 | Butera et al. | |
| 2002/0112788 A1 | 8/2002 | Tanaka et al. | |
| 2003/0178074 A1 | 9/2003 | Itzhaky | |
| 2003/0183289 A1 * | 10/2003 | Seuret | F16K 31/0624 137/625.65 |
| 2005/0005980 A1 | 1/2005 | Eberhardt et al. | |
| 2005/0024174 A1 | 2/2005 | Kolb et al. | |
| 2005/0139610 A1 | 6/2005 | Crossdale et al. | |
| 2005/0139796 A1 | 6/2005 | Altonji | |
| 2005/0263196 A1 * | 12/2005 | Hsieh | F17D 1/04 137/883 |
| 2007/0023089 A1 | 2/2007 | Beyerlein et al. | |
| 2007/0113906 A1 | 5/2007 | Sturman et al. | |
| 2008/0034749 A1 | 2/2008 | Ukpai et al. | |
| 2008/0271559 A1 | 11/2008 | Garscha et al. | |
| 2009/0302708 A1 | 12/2009 | Takahashi | |
| 2010/0139785 A1 | 6/2010 | Saitoh et al. | |
| 2011/0095216 A1 * | 4/2011 | deGreef | G05D 7/0664 251/129.15 |
| 2012/0067430 A1 | 3/2012 | Deperraz et al. | |
| 2012/0143108 A1 | 6/2012 | Bocsanyi et al. | |
| 2012/0153043 A1 | 6/2012 | Arekar et al. | |
| 2012/0199763 A1 | 8/2012 | Lind | |
| 2012/0199768 A1 | 8/2012 | Love et al. | |
| 2014/0103232 A1 | 4/2014 | Deperraz | |
| 2014/0191549 A1 * | 7/2014 | Hermansson | F16K 31/0658 251/64 |
| 2014/0232155 A1 | 8/2014 | Bocsanyi et al. | |
| 2015/0028234 A1 | 1/2015 | Kraus et al. | |
| 2015/0141887 A1 * | 5/2015 | Kawashima | F16K 11/22 601/149 |
| 2016/0018016 A1 | 1/2016 | Dankbaar et al. | |
| 2016/0153575 A1 | 6/2016 | Sohn | |
| 2016/0207075 A1 | 7/2016 | Alexander et al. | |
| 2017/0025784 A1 | 1/2017 | Greene | |
| 2017/0097104 A1 | 4/2017 | Deperraz | |
| 2018/0023906 A1 | 1/2018 | Tajiri et al. | |
| 2018/0038514 A1 | 2/2018 | Kusneruk et al. | |
| 2018/0283571 A1 | 10/2018 | Miyazoe et al. | |
| 2018/0306212 A1 | 10/2018 | Weickel et al. | |
| 2018/0363642 A1 | 12/2018 | Salih et al. | |
| 2019/0003609 A1 | 1/2019 | Asai et al. | |
| 2019/0049026 A1 | 2/2019 | Beuschel et al. | |
| 2019/0049033 A1 | 2/2019 | Mitzler et al. | |
| 2019/0107214 A1 | 4/2019 | Kruppe et al. | |
| 2019/0116681 A1 | 4/2019 | De Carolis et al. | |
| 2019/0118690 A1 | 4/2019 | Beuschel et al. | |
| 2019/0120402 A1 | 4/2019 | Jamison et al. | |
| 2019/0195246 A1 | 6/2019 | Jamison et al. | |
| 2019/0353268 A1 | 11/2019 | Dorfler et al. | |
| 2019/0353270 A1 | 11/2019 | Dorfler et al. | |
| 2020/0088314 A1 | 3/2020 | Samain et al. | |
| 2020/0103047 A1 | 4/2020 | Beuschel et al. | |
| 2020/0287322 A1 | 9/2020 | Dörfler et al. | |
| 2020/0347833 A1 | 11/2020 | Dankbaar et al. | |
| 2020/0378516 A1 | 12/2020 | Beuschel et al. | |
| 2021/0018109 A1 | 1/2021 | Beuschel et al. | |
| 2022/0243827 A1 | 8/2022 | Nicola et al. | |
| 2023/0125583 A1 | 4/2023 | Pagel et al. | |

FOREIGN PATENT DOCUMENTS

| | | |
|---|---|---|
| CN | 2526615 Y | 12/2002 |
| CN | 101095000 A | 12/2007 |
| CN | 103991396 A | 8/2014 |
| CN | 105465090 A | 4/2016 |
| CN | 108953683 A | 12/2018 |
| CN | 109318770 A | 2/2019 |
| DE | 19545011 A1 | 4/1997 |
| DE | 19718169 A1 | 11/1998 |
| DE | 10063478 A1 | 7/2002 |
| DE | 102005060217 A1 | 7/2006 |
| DE | 102006053147 A1 | 5/2007 |
| DE | 102011100327 B3 | 8/2012 |
| DE | 102013208820 A1 | 11/2014 |
| DE | 202014006875 U1 | 12/2014 |
| DE | 102015201534 B3 | 4/2016 |
| DE | 102014225756 A1 | 6/2016 |
| DE | 102016225519 A1 | 6/2018 |
| DE | 102017204662 B3 | 7/2018 |
| DE | 102017107073 A1 | 10/2018 |
| DE | 102017217213 B3 | 3/2019 |
| DE | 102018200635 A1 | 7/2019 |
| EP | 0423045 A1 | 4/1991 |
| EP | 1619287 A1 | 1/2006 |
| EP | 1909008 A1 | 4/2008 |
| EP | 1988440 A1 | 11/2008 |
| EP | 2078891 A2 | 7/2009 |
| EP | 2740521 A1 | 6/2014 |
| EP | 2860401 A2 | 4/2015 |
| EP | 3343078 A1 | 7/2018 |
| GB | 830393 A | 3/1960 |
| GB | 830394 A | 3/1960 |
| GB | 971816 A | 10/1964 |
| JP | 4091035 B2 | 5/2008 |
| WO | 2004104462 A1 | 12/2004 |
| WO | 2012159689 A1 | 11/2012 |
| WO | 2014135909 A1 | 9/2014 |

(56) References Cited

FOREIGN PATENT DOCUMENTS

| WO | 2015185132 A  | 12/2015 |
| WO | 2018005528 A1 | 1/2018  |
| WO | 2018049526 A1 | 3/2018  |
| WO | 2018065217 A1 | 4/2018  |
| WO | 2019149498 A1 | 8/2019  |
| WO | 2019218072 A1 | 11/2019 |

OTHER PUBLICATIONS

International Search Report and Written Opinion for Application No. PCT/EP2020/51138 dated Mar. 30, 2020 (12 pages).
European Patent Office Extended Search Report for Application No. 19157920.0 dated Jul. 19, 2019 (7 pages).
G.Rau, Innovative Metalle, "Thermal Actuators", 12 pages, retrieved Apr. 7, 2019.

* cited by examiner

FLUID VALVE MODULE, FLUID VALVE SYSTEM AND METHODS OF PRODUCING THE SAME

FIELD OF THE INVENTION

Various embodiments of the invention relate to a fluid valve module, a fluid valve system and respective methods of producing the same. Various embodiments relate in particular to fluid valve modules and systems for use in automotive, aircraft or furniture seating.

BACKGROUND OF THE INVENTION

Known valve systems used in seating applications typically perform customer-specific functions which may be provided by an integrated valve solution or a compound solutions comprising several separate valves, so-called stand-alone designs.

Integrated valve solutions can't be adapted for every customer requirement, so that they can only be used in systems having same or reduced range of functions. For latter systems, this entails the disadvantages of excessive component costs and form factor.

The smaller valves of compound solutions involve even higher component costs and form factor, as well as higher manufacturing costs, since electrical and pneumatic seat interfaces have to be connected to each valve separately, which requires excessive cables, electrical plugs and pneumatic tubes.

US 2007/023089 A1 and DE 10 2005 060 217 A1 respectively disclose a valve including a valve housing encompassing a pressure chamber and possessing at least two valve ports which open into the pressure chamber, whereby at least one axially slideable valve stem in the pressure chamber controls at least one of the valve ports.

BRIEF SUMMARY OF THE INVENTION

In view of the above, there is a need in the art for modular valve systems which address some of the above needs. In particular, there is a need in the art for modular valve solutions providing customer-required functions only, using a minimum of fundamental components, and thus entailing less component costs, manufacturing cost as well as form factor.

These underlying objects of the invention are each solved by the features as defined by the independent claims. Preferred embodiments of the invention are set forth in the dependent claims.

According to a first aspect, a fluid valve module is provided. The fluid valve module comprises a housing and a plurality of valve members. The housing comprises a housing body and a housing cover. The housing body comprises a fluid feed partition, a plurality of valve body partitions, and a plurality of valve ports. The housing body further comprises wall openings between an interior of the fluid feed partition and an exterior of the housing body. The valve body partitions are each shaped for mating with the housing cover in a fluid-tight manner, and are each in fluid communication with the fluid feed partition and at least one of the valve ports. The valve members are each arranged in a respective valve body partition for controlling a passage of a fluid from the fluid feed partition via the respective valve body partition to the at least one of the valve ports.

The housing cover may be formed as a housing lid.

The valve members may each comprise a respective valve actuator.

The respective valve actuator may comprise a solenoid.

The fluid valve module may further comprise a module PCB being shaped for mating with the housing body and being arranged for electrically connecting the valve members.

According to a second aspect, a fluid valve system is provided. The fluid valve system comprises a plurality of fluid valve modules according various embodiments, and at least one connecting means or connecting element. The housings of the fluid valve modules are each shaped for mating with one another. The wall openings are arranged for alignment with one another upon mating of the housings of the fluid valve modules. The connecting means are arranged for concatenating respective fluid feed partitions of mated fluid valve modules in a fluid-tight manner via the aligned wall openings.

As the fluid valve system according to this aspect comprises the plurality of fluid valve modules that may be coupled to each other as described above, an fluid valve system having a variable configuration may be obtained in the form of an individualized control system.

The housings of the fluid valve modules each may be shaped for mating with one another in an abutting engagement of those walls of the housing bodies comprising the wall openings.

The connecting means may be sleeve-shaped for fitting into the aligned wall openings.

The fluid valve system may further comprise a system PCB being shaped for mating with the housing bodies of mated fluid valve modules, and being arranged for electrically connecting the valve members of mated fluid valve modules.

Alternatively, the module PCBs may each be shaped for mating with one another, and may be arranged for electrically connecting the valve members of mated fluid valve modules.

According to a third aspect, a method of producing a fluid valve module is provided. The method comprises a step of providing a housing body and a housing cover of a housing. The housing body comprises a fluid feed partition, a plurality of valve body partitions, and a plurality of valve ports. The housing body further comprises wall openings between an interior of the fluid feed partition and an exterior of the housing body. The valve body partitions are each shaped for mating with the housing cover in a fluid-tight manner, and are each in fluid communication with the fluid feed partition and at least one of the valve ports. The method further comprises a step of arranging a plurality of valve members in respective valve body partitions for controlling a passage of a fluid from the fluid feed partition via the respective valve body partition to the at least one of the valve ports. The method further comprises a step of mating the housing body and the housing cover.

The method may further comprise a step of mating a module PCB with the housing body for electrically connecting the valve members.

According to a fourth aspect, a method of producing a fluid valve system is provided. The method comprises steps of producing a plurality of fluid valve modules of various embodiments by performing the method of producing a fluid valve module of various embodiments a plurality of times. The method further comprises a step of mating the housings of the fluid valve modules with one another, thereby aligning the wall openings with one another. The method further comprises a step of providing at least one connecting means.

The method further comprises a step of concatenating respective fluid feed partitions of mated fluid valve modules in a fluid-tight manner via the aligned wall openings by a respective one of the at least one connecting means.

The method may further comprise a step of mating a system PCB with the housing body of the mated fluid valve modules, thereby electrically connecting the valve members of the mated fluid valve modules.

Alternatively, the method may further comprise a step of mating the module PCBs with one another, thereby electrically connecting the valve members of the mated fluid valve modules.

According to a fifth aspect, a lumbar support unit for an automotive seat, an aircraft seat, or a seating furniture, comprises a fluid valve module according to various embodiments, or a fluid valve system according to various embodiments; and at least one air bladder connected to the fluid valve module or the fluid valve system.

According to a sixth aspect, a bolster unit for an automotive seat, an aircraft seat, or a seating furniture, comprises a fluid valve module of various embodiments, or a fluid valve system of various embodiments; and at least one air bladder connected to the fluid valve module or the fluid valve system.

According to a seventh aspect, a massage unit for an automotive seat, an aircraft seat, or a seating furniture, comprises a fluid valve system of various embodiments; and a plurality of air bladders connected to the fluid valve system.

BRIEF DESCRIPTION OF THE DRAWINGS

Embodiments of the invention will be described with reference to the accompanying drawings, in which the same or similar reference numerals designate the same or similar elements.

DETAILED DESCRIPTION OF EMBODIMENTS

Exemplary embodiments of the invention will now be described with reference to the drawings. While some embodiments will be described in the context of specific fields of application, the embodiments are not limited to this field of application. Further, the features of the various embodiments may be combined with each other unless specifically stated otherwise.

The drawings are to be regarded as being schematic representations and elements illustrated in the drawings are not necessarily shown to scale. Rather, the various elements are represented such that their function and general purpose become apparent to a person skilled in the art.

A "fluid" as used herein may refer to a substance being in a state of matter wherein the substance continually deforms (flows) under an applied shear stress, or external force. In particular, fluids include liquids and gases, such as pressurized air.

A "housing" as used herein may refer to an enclosure providing protection from external factors, such as, for instance, contamination or differential pressure.

"Mating" as used herein may refer to joining or fitting together separate items being matched to one another, particularly in terms of shape, design and/or function so as to complement each other with respect to a fit and/or engagement with one another.

An "opening" as used herein may refer to a through hole in a solid structure that provides a barrier or enclosure, such as a wall. The through hole may, in particular, have a circular cross-section.

A "partition" as used herein may refer to a section of a housing serving a particular purpose. For instance, a "fluid feed partition" as used herein may refer to a partition through which a fluid feed for rendering an actuation energy is accomplished. For instance, a "valve body partition" as used herein may refer to a partition serving as a valve body for enclosing a valve member.

A "printed circuit board" or PCB as used herein may refer to a sheet-like structure arranged for providing mechanical support and electrical connectivity using conductive features etched from one or more metallic sheet layers laminated onto and/or between sheet layers of a non-conductive substrate.

A "valve" or "fluid valve" as used herein may refer to a device for adjustable control of throughflow of a fluid between valve ports and via a valve body, using an actuatable valve member enclosed in the valve body to open, close, or partially obstruct a passageway between the ports. The fluid generally flows from higher to lower pressure if the passageway (or simply: the valve) is open or only partially obstructed. Valves may be classified according to their number of ports P and their number of operating states S as P/S valves, such as 2/2, 3/2, and 3/3 valves, for instance. Valves controlling throughflow of gases, such as pressurized air, are known as pneumatic valves.

A "valve member" is an actuatable obstruction in a passageway between valve ports. A valve member may be actuated by a valve actuator, for instance an electromechanical actuator such as a solenoid. A valve member may be allowed to be removed from a normal/default position maintained by spring-loading. For instance, a 2/2 valve may be normally closed or normally open.

A "valve port" as used herein may refer to a terminal of a valve allowing inflow and/or outflow of a fluid.

Figure 1:
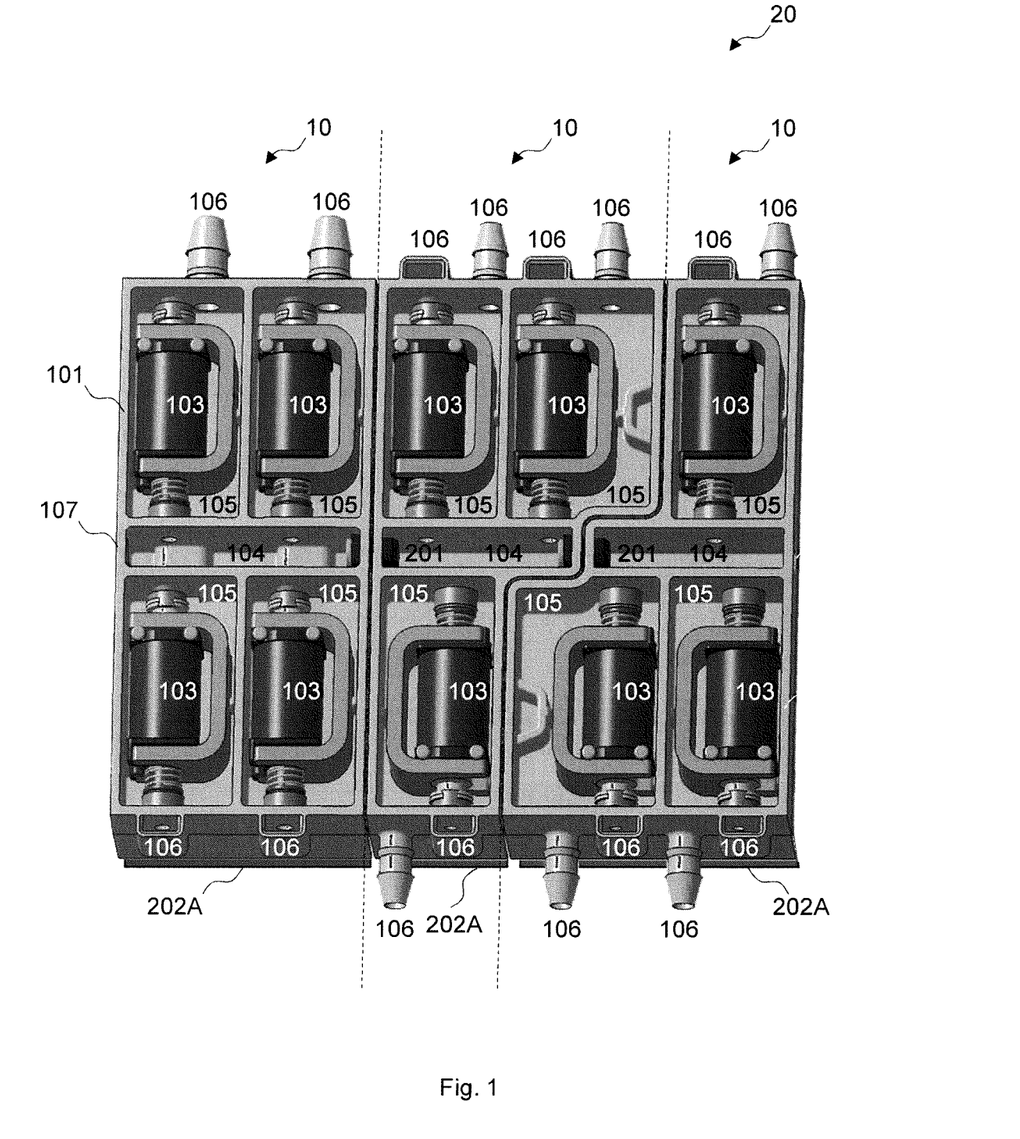
FIGS. 1 and 2 illustrate an exemplary fluid valve system of an embodiment, exemplarily comprising three fluid valve modules of various embodiments.
Figure 2:
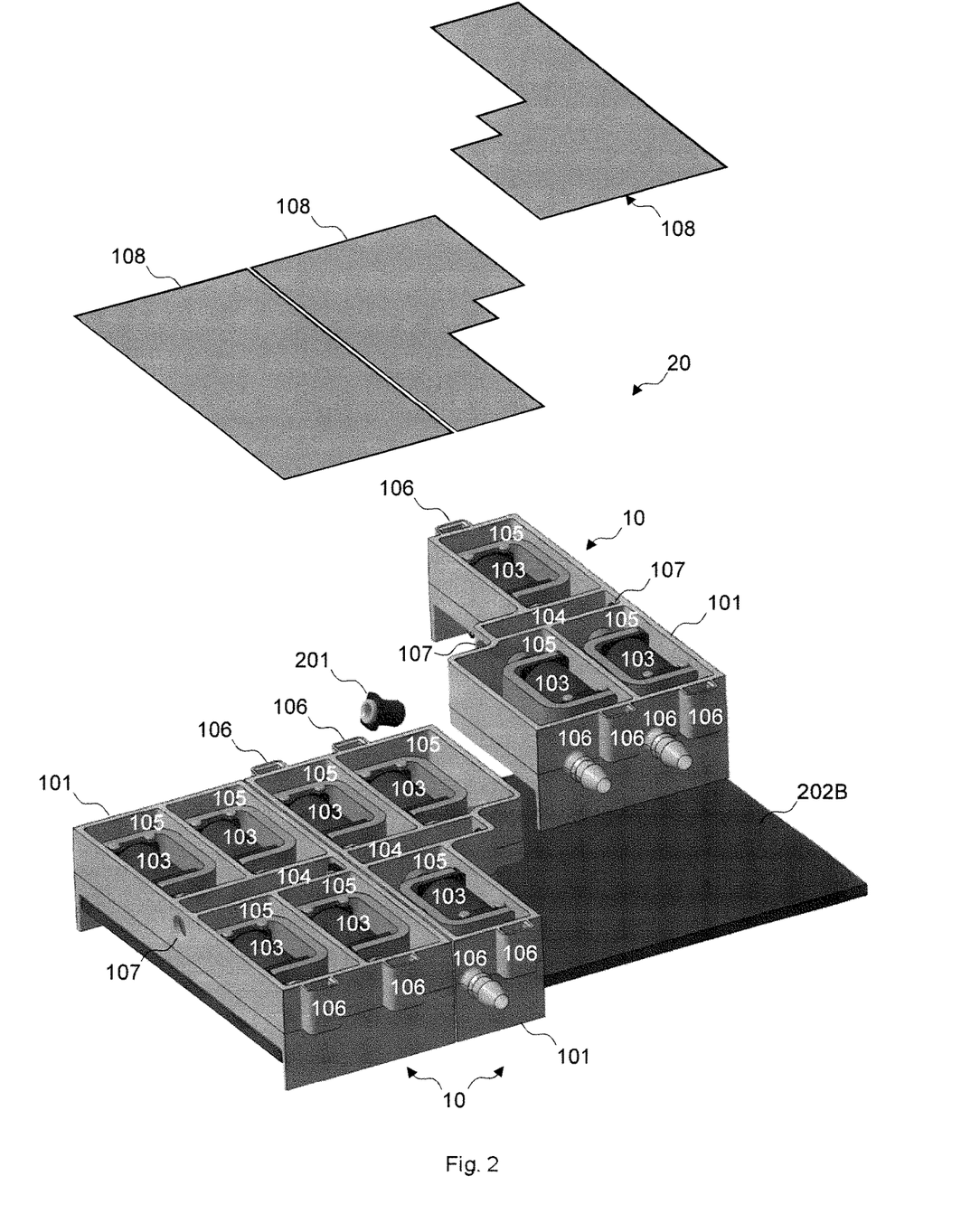

FIGS. 1 and 2 illustrate an exemplary fluid valve system 20 of an embodiment, exemplarily comprising three fluid valve modules 10 of various embodiments.

As illustrated in both FIG. 1 and FIG. 2, it will be appreciated that each fluid valve module 10 comprises a housing and a plurality of valve members 103.

Turning to the housings of the fluid valve modules 10, the respective housing comprises a housing body 101 and a housing cover 108, which housing cover 108 is best seen in FIG. 2. The respective housing body 101 comprises a fluid feed partition 104, a plurality of valve body partitions 105, and a plurality of valve ports 106. In particular, the fluid feed partition 104 as well as the plurality of valve body partitions 105 may each form cavities in the respective housing body 101. The respective housing body 101 further comprises wall openings 107 between an interior of the fluid feed partition 104 and an exterior of the housing body 101. In particular, the wall openings 107 may have circular cross-sections. The valve body partitions 105 are each shaped for mating with the housing cover in a fluid-tight manner, and are each in fluid communication with the fluid feed partition 104 and at least one of the valve ports 106, in particular via further wall openings between the interiors of respective partitions 104, 106.

Turning to the valve members 103 of the fluid valve modules 10, the valve members 103 may each comprise a respective valve actuator, and the respective valve actuator may comprise a solenoid. The valve members 103 are each arranged in respective valve body partitions 105 for controlling a passage of a fluid from the respective fluid feed partition 104 via the respective valve body partition 105 to the at least one of the valve ports 106.

Differently to known stand-alone valve solutions, the valve members (and actuators) 103 are grouped to modular functional blocks, i.e., the above-described fluid valve modules 10, and not maintained separately. Each functional block is arranged for actuation of a modular actuation unit such as lumbar support, bolstering and massaging units in seating applications, for instance, for which two or more known valves would be needed. This yields a modular fluid valve construction system which is based on a small number of fundamental components and requires only a limited number of functional blocks to be maintained. As a result, a number of mechanical interfaces is decreased, production and logistics are simplified, and a bill of material as well as expenses for production and logistics are reduced.

Different to known integrated valve solutions, the functional blocks are modular parts based on which prototyping and provisioning of customer- or application-specific fluid valve systems is simplified, since a same fluid valve module can be re-used for different fluid valve systems and customers. As only customer-required functions are provided, a minimum of fundamental components or functional blocks is needed. As a result, a bill of material as well as expenses for production and logistics are reduced. In addition, a form factor of the resulting fluid valve systems is be reduced.

Forming larger fluid value systems 20 is facilitated since the housings of the fluid valve modules 10 are each shaped for mating with one another to form the fluid value system 20. In particular, the housings of the fluid valve modules 10 may each be shaped for mating with one another in an abutting engagement of those walls of the housing bodies 101 comprising the wall openings 107. The wall openings 107 are arranged for alignment with one another upon mating of the housings of the fluid valve modules 10, i.e., upon mating of the fluid valve modules 10.

With continued reference to the fluid value system 20 shown in FIG. 1 and FIG. 2, the fluid valve system 20 comprises at least one connecting means or connecting element 201 which is arranged for concatenating respective fluid feed partitions 104 of mated fluid valve modules 10 in a fluid-tight manner via the aligned wall openings 107. In particular, the connecting means 201 may be sleeve-shaped for fitting into the aligned wall openings 107. Alternatively, the connecting means 201 may be formed by projections, recesses and/or openings of the housing bodies 101 being arranged for concatenating the respective fluid feed partitions 104 of mated fluid valve modules 10 in a fluid-tight manner without using separate connecting elements.

Depending on the respective design requirements of the fluid valve system, the connecting means 201 may be mounted to the fluid valve system prior or after the assembly of the individual fluid valve modules 10.

Different to known valve solutions, a fluid supply can be realized by a common fluid feed. This eliminates excessive and error-prone electrical wiring.

The fluid valve module 10 according to embodiments may further comprise a module PCB 202A being shaped for mating with the housing body 101 and being arranged for electrically connecting the valve members 103. The module PCBs 202A may each be shaped for mating with one another, and be arranged for electrically connecting the valve members 103 of mated fluid valve modules 10. Alternatively, as illustrated in FIGS. 1 and 2, the fluid valve system 20 may further comprise a system PCB 202B being shaped for mating with the housing bodies 101 of mated fluid valve modules 10, and being arranged for electrically connecting the valve members 103 of mated fluid valve modules 10.

Different to known valve solutions, an energy supply can be realized by a common mains connection via a common system PCB or via a plurality of module PCBs 202A. This eliminates excessive and error-prone electrical wiring. A system PCB provides a high mechanical rigidity to a fluid value system, but may also increase the number of components of the modular fluid valve construction system. By contrast, modular PCBs may not increase the number of components of the modular fluid valve construction system as much, at the expense of mechanical rigidity of the fluid value system.

Figure 3:
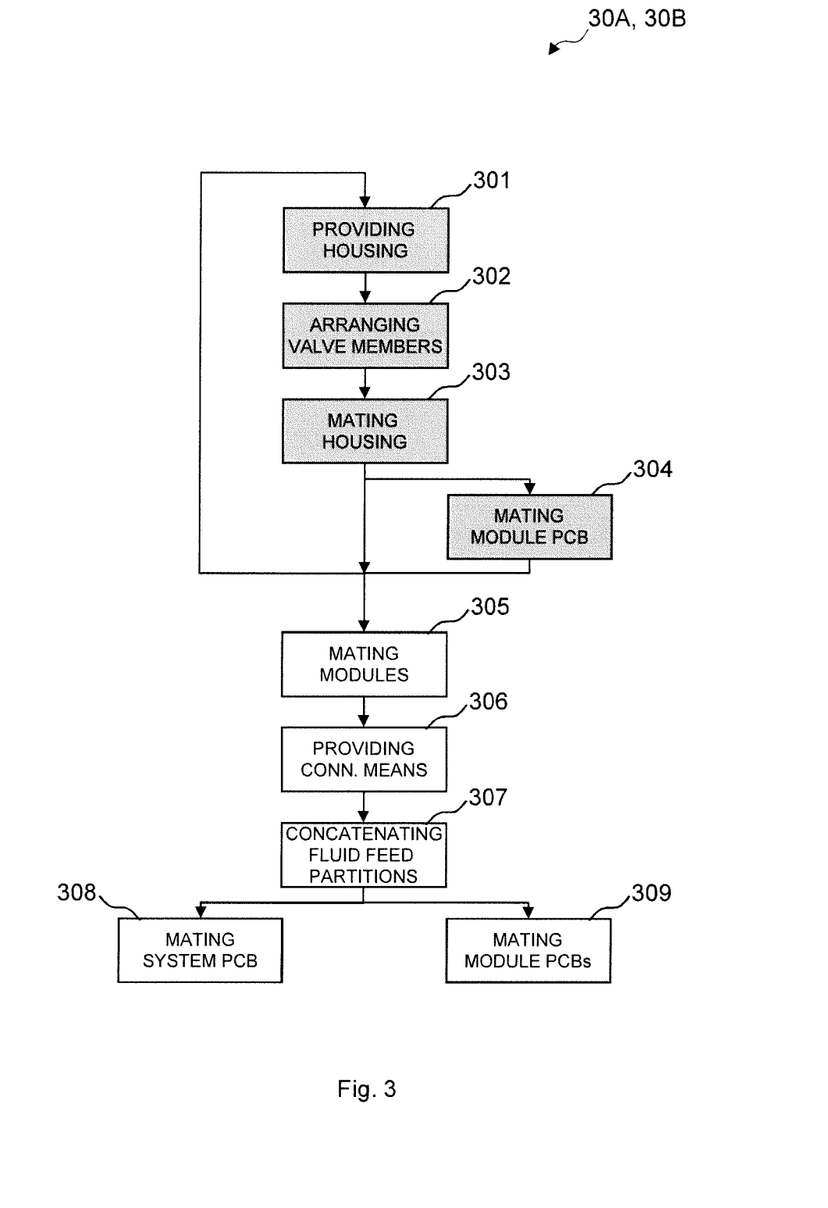
FIG. 3 illustrates methods of producing a fluid valve module and a fluid valve system, respectively.

FIG. 3 illustrates methods 30A, 30B of producing a fluid valve module 10 and a fluid valve system 20, respectively.

With reference to an upper section of FIG. 3, it will be appreciated that the method 30A of producing a fluid valve module 10 comprises steps 301-303, and may comprise step 304, which steps are represented as shaded boxes.

At step 301, a housing body 101 and a housing cover of a housing are provided 301. The housing body 101 comprises a fluid feed partition 104, a plurality of valve body partitions 105, and a plurality of valve ports 106. The housing body 101 further comprises wall openings 107 between an interior of the fluid feed partition 104 and an exterior of the housing body 101. The valve body partitions 105 are each shaped for mating with the housing cover in a fluid-tight manner, and are each in fluid communication with the fluid feed partition 104 and at least one of the valve ports 106.

At step 302, a plurality of valve members 103 is arranged 302 in respective valve body partitions 105 for controlling a passage of a fluid from the fluid feed partition 104 via the respective valve body partition 105 to the at least one of the valve ports 106.

At step 303, the housing body 101 and the housing cover are mated 303.

At step 304, a module PCB 202A is mated 304 with the housing body 101 for electrically connecting the valve members 103.

The method 30A may be performed a plurality of times for producing a plurality of fluid valve modules 10 of various embodiments.

With reference to FIG. 3 as a whole, it will be appreciated that the method 30B of producing a fluid valve system 20 comprises, besides the above-mentioned steps of method 30A, further steps 305-307, and may comprise any one of further steps 308 or 309, which further steps are represented as unshaded boxes.

The method 30B uses the products directly obtained by method 30A, which endorses the modularity of the resulting fluid valve system 20.

At step 305, the housings of the fluid valve modules 10 are mated 305 with one another, thereby aligning the wall openings 107 with one another.

At step 306, at least one connecting means 201 is provided 306.

At step 307, respective fluid feed partitions 104 of mated fluid valve modules 10 are concatenated 307 in a fluid-tight manner via the aligned wall openings 107 by a respective one of the at least one connecting means 201.

At step 308, which may be performed alternatively to step 309, a system PCB 202B is mated 308 with the housing body 101 of the mated fluid valve modules 10, thereby electrically connecting the valve members 103 of the mated fluid valve modules 10.

At step 309, which may be performed alternatively to step 308, the module PCBs 202A, if provided, are mated 309 with one another, thereby electrically connecting the valve members 103 of the mated fluid valve modules 10.

Figure 4:
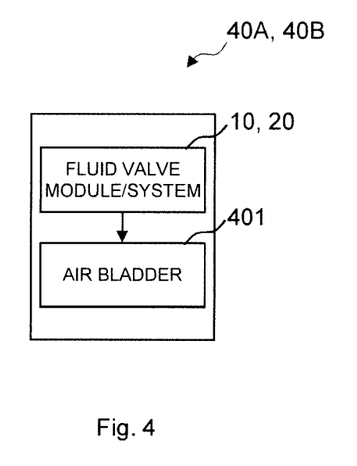
FIGS. 4 and 5 illustrate actuation units of embodiments respectively comprising a fluid valve module or a fluid valve system of various embodiments.
Figure 5:
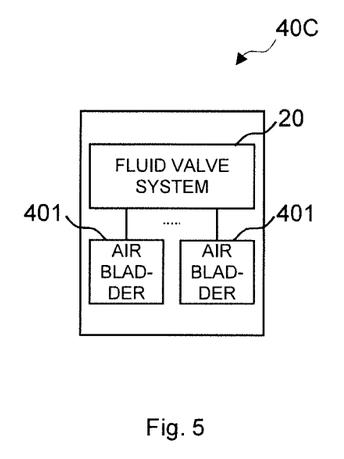

FIGS. 4 and 5 illustrate actuation units 40A, 40B, 40C of embodiments respectively comprising a fluid valve module 10 or a fluid valve system 20 of various embodiments.

Fluid valve modules 10 and fluid valve systems 20 of various embodiments may be used in automotive, aircraft, and furniture seating applications for actuation of various modular actuation units such as lumbar support, bolstering and massaging units 40A, 40B, 40C.

According to FIG. 4, a lumbar support unit 40A and a bolster unit 40B of embodiments respectively comprise a fluid valve module 10 or a fluid valve system 20 of various embodiments, and at least one air bladder 401 connected to the fluid valve module 10 or the fluid valve system 20.

According to FIG. 5, a massage unit 40C of an embodiment comprises a fluid valve system 20 of various embodiments, and a plurality of air bladders 401 connected to the fluid valve system 20.

While fluid valve modules and fluid valve systems and methods of producing the same according to various embodiments have been described, those skilled in the art will appreciate that the present invention is not so limited and that the present invention may be carried out in other ways than those specifically set forth herein without departing from essential characteristics of the invention. The present embodiments are therefore to be considered in all respects as illustrative and not restrictive, and all changes coming within the meaning and equivalency range of the appended claims are intended to be embraced therein.

The invention claimed is:

1. A fluid valve system, comprising:
   a plurality of fluid valve modules, each valve module including
      a housing having a housing body and a housing cover, the housing body having
         a fluid feed partition defining a fluid feed chamber,
         a plurality of valve body partitions each defining a valve body chamber, and a plurality of valve ports, wherein the fluid feed chamber and the valve body chambers of at least two of the plurality of valve body partitions share a common wall having a plurality of fluid feed openings;
         the housing body further having wall openings between the fluid feed chamber and an exterior of the housing body, the wall openings positioned on opposite ends of the fluid feed chamber;
         each valve body partition of the plurality of valve body partitions being shaped for mating with the housing cover in a fluid-tight manner, and being in fluid communication with the fluid feed partition through a respective one of the fluid feed openings, and in fluid communication with at least one of the plurality of valve ports; and
      and a plurality of valve members, each valve member of the plurality of valve members being arranged in a respective valve body partition of the plurality of valve body partitions for controlling a passage of a fluid from the fluid feed partition via the respective valve body partition to the at least one of the plurality of valve ports, each fluid valve module having the wall openings positioned on the opposite ends of the fluid feed chamber between the fluid feed chamber and an exterior of the housing body;
   at least one connector; and
   a system PCB shaped for mating with the housing bodies of mated fluid valve modules, wherein the system PCB is arranged for electrically connecting the valve members of the mated fluid valve modules, the system PCB is external to the housing body,
   wherein the housings of the plurality of fluid valve modules are each shaped for mating with one another,
   wherein the wall opening of one of the plurality of fluid valve modules is arranged for alignment with one another wall opening of an adjacent fluid valve module upon mating of the housings of the plurality of fluid valve modules,
   wherein the connector is arranged for concatenating the fluid feed partitions of mated fluid valve modules in a fluid-tight manner via the aligned wall openings.

2. The fluid valve system of claim 1, wherein each valve member of the plurality of valve members comprises a valve actuator.

3. The fluid valve system of claim 2, wherein the valve actuator of each valve member of the plurality of valve members comprises a solenoid.

4. The fluid valve system of claim 1, wherein the housings of the plurality of fluid valve modules are each shaped for mating with one another in an abutting engagement of those walls of the housing bodies comprising the wall openings.

5. The fluid valve system of claim 1, wherein the connector is sleeve-shaped for fitting into the aligned wall openings.

6. The fluid valve system of claim 1,
   wherein each fluid valve module of the plurality of fluid valve modules further comprises a module PCB shaped for mating with the housing body and arranged for electrically connecting the plurality of valve members, and
   wherein the module PCBs of the plurality of fluid valve modules are each shaped for mating with one another and arranged for electrically connecting the valve members of the mated fluid valve modules.

7. A lumbar support unit for an automotive seat, an aircraft seat, or a seating furniture, comprising:
   the fluid valve system of claim 1; and
   at least one air bladder connected to the fluid valve system.

8. A bolster unit for an automotive seat, an aircraft seat, or a seating furniture, comprising:
   the fluid valve system of claim 1; and
   at least one air bladder connected to the fluid valve system.

9. A massage unit for an automotive seat, an aircraft seat, or a seating furniture, comprising:
   the fluid valve system of claim 1; and
   a plurality of air bladders connected to the fluid valve system.

10. A method of producing a fluid valve system, the method comprising:
    producing a plurality of fluid valve modules by
       providing a plurality of housing bodies and a plurality of housing covers of a plurality of housings,
       the housing body comprising a fluid feed partition defining a fluid feed chamber, a plurality of valve body partitions, each defining a valve body chamber, and a plurality of valve ports, wherein the fluid feed chamber and the valve body chambers of at least two of the plurality of valve body partitions share a common wall having a plurality of fluid feed openings, the housing body further comprising wall openings between the fluid feed chamber partition and an exterior of the housing body, the wall openings positioned on opposite sides of the fluid feed partition, each valve body partition of the plurality of valve body partitions being shaped for mating with the housing cover in a fluid-tight manner, and being in fluid communication with the fluid feed partition through a respective one of the fluid feed openings, and in fluid communication with at least one of the plurality of valve ports;

arranging a plurality of valve members in respective valve body partitions of the plurality of valve body partitions for controlling a passage of a fluid from the fluid feed partition via the respective valve body partitions to the at least one of the plurality of valve ports; and mating the housing bodies and the housing covers;

mating the housings of the plurality of fluid valve modules with one another, thereby aligning the wall openings of the plurality of fluid valve modules with one another;

providing at least one connector;

concatenating respective fluid feed partitions of mated fluid valve modules in a fluid-tight manner via the aligned wall openings by a respective one of the at least one connector; and mating a system PCB with the housing body of the mated fluid valve modules, thereby electrically connecting the valve members of the plurality of valve members of the mated fluid valve modules.

11. The method of claim 10, further comprising:

for each fluid valve module of the plurality of fluid valve modules, mating a module PCB with the housing body of the respective fluid valve module of the plurality of fluid valve modules for electrically connecting the plurality of valve members of the respective fluid valve module of the plurality of fluid valve modules; and mating the module PCBs of the plurality of fluid valve modules with one another, thereby electrically connecting the valve members of the mated fluid valve modules of the plurality of fluid valve modules.

* * * * *